United States Patent [19]

Gomez et al.

[11] Patent Number: 5,051,909
[45] Date of Patent: Sep. 24, 1991

[54] METHOD AND MEANS FOR DETERMINING EXHAUST BACKPRESSURE IN A CRANKCASE SCAVENGED TWO-STOKE ENGINE

[75] Inventors: Aparicio J. Gomez, Birmingham; Douglas E. Trombley, Warren; Dennis W. Montville, Utica, all of Mich.

[73] Assignee: General Motors Corporation, Detroit, Mich.

[21] Appl. No.: 407,984

[22] Filed: Sep. 15, 1989

[51] Int. Cl.$^5$ ............................................. F02M 49/00
[52] U.S. Cl. .................................. 364/431.05; 60/278; 123/65 R; 123/65 E; 123/73 C
[58] Field of Search ............... 60/314, 278; 123/65 R, 123/73 C, 73 SP, 382, 65 E; 364/431.05

[56] References Cited

U.S. PATENT DOCUMENTS

| | | | |
|---|---|---|---|
| 3,190,271 | 6/1965 | Gudmundsen | 123/73 C X |
| 3,875,744 | 4/1975 | Brooks et al. | 123/65 E X |
| 4,064,693 | 12/1977 | Shibata | 60/290 |
| 4,185,598 | 1/1980 | Onishi | 123/73 C X |
| 4,302,814 | 11/1981 | Full et al. | 364/431.04 |
| 4,446,833 | 5/1984 | Matsushita et al. | 123/73 C X |
| 4,461,260 | 7/1984 | Nonaka et al. | 123/65 R X |
| 4,750,464 | 6/1988 | Staerzl | 123/494 |
| 4,901,701 | 2/1990 | Chasteen | 123/428 |

Primary Examiner—Parshotam S. Lall
Assistant Examiner—Edward R. Cosimano
Attorney, Agent, or Firm—Jimmy L. Funke

[57] ABSTRACT

A method and means are described for determining the average backpressure at a cylinder exhaust port in a crankcase scavenged two-cycle engine. The exhaust backpressure is determined by averaging the pressure of air within a crankcase chamber associated with the cylinder, during a portion of the engine operating cycle when the cylinder inlet and exhaust ports are simultaneously open. The overlap interval in port openings creates a channel for airflow between the crankcase chamber and the cylinder exhaust port, and except for an initial portion of the interval assocated with the pressure equalization between the cylinder and its crankcase chamber, the crankcase pressure substantially equals the backpressure appearing at the cylinder exhaust port. In the preferred embodiment of the invention, a pressure sensor is disposed within the crankcase chamber to sample air pressure at specified engine rotational positions during the overlap interval. These samples are then numerically averaged to obtain the average exhaust backpressure, which is used for compensating the amount of air inducted per cylinder per engine cycle to determined the amount of air per cylinder trapped and available for combustion within the engine. The control of the engine is thereby automatically corrected to account for changes in the engine exhaust system, the altitude of engine operation, and local barometric pressure.

6 Claims, 3 Drawing Sheets

METHOD AND MEANS FOR DETERMINING EXHAUST BACKPRESSURE IN A CRANKCASE SCAVENGED TWO-STOKE ENGINE

BACKGROUND OF THE INVENTION

This invention relates to the determination of engine exhaust backpressure and more particularly to a method and means for remotely determining the average backpressure at a cylinder exhaust port in a crankcase scavenged, two-stroke engine by averaging the pressure of air within a crankcase chamber during a portion of the engine operating cycle. A crankcase scavenged two-stroke engine has a separate crankcase chamber for each engine cylinder. During portions of the engine operating cycle, air is inducted into each crankcase chamber, compressed during the time when the crankcase chamber is decreasing in volume, and then transferred to the associated cylinder combustion chamber where it is mixed with fuel for ignition.

In a direct fuel injected, crankcase scavenged, two-stroke engine, knowledge of the mass of air per cylinder available for combustion is required for the precise control of engine operating parameters such as spark advance, injection timing, and fueling requirements. Conventionally, the mass of air per cylinder inducted into the engine is measured during an engine cycle and then compensated by a factor known as the cylinder trapping efficiency to determine the mass of air actually captured within a cylinder. The trapping efficiency is a function of engine design, engine rotational speed, the mass of air per cylinder inducted into the engine, and the exhaust backpressure.

In a crankcase scavenged, two-stroke engine, the exhaust backpressure is especially significant with regard to the trapping efficiency because of the absence of engine valves. Instead of valves, this type of engine has inlet and exhaust ports opening into each cylinder wall. During the downstroke of a piston in a cylinder, the exhaust port is first uncovered by the moving piston to release combustion products, followed by the uncovering of the inlet port to enable the entry of a fresh charge of air for the next combustion event. Because there is significant overlap in the in the periods of time during which the inlet and exhaust ports are open, a portion of the fresh air charge escapes out the open exhaust port, and will not be available for the next combustion event. The larger the backpressure appearing at the exhaust port, the smaller will be the amount of air which escapes, due to the reduced pressure differential between the cylinder and the engine exhaust system. Also, as the backpressure increases, the resistance to airflow from the crankcase into the cylinder increases, thereby reducing the mass of air transferred.

Since the average exhaust backpressure is equal to the local barometric pressure plus the pressure drop associated with the engine exhaust system, changes in the exhaust system, in the altitude of engine operation, or in local barometric pressure will affect the amount of fresh air which is available for combustion within a cylinder For the above reasons, some measure of engine exhaust backpressure, either direct or indirect, is essential for proper engine control.

A pressure sensor can be used to directly measure the exhaust backpressure within the exhaust system, however, such a sensor will generally be expensive and have poor durability due to the hostility of the exhaust system environment. Also, an average value for the exhaust backpressure, near the engine exhaust port, can be obtained indirectly by measuring barometric pressure, and then adding an estimated pressure drop associated with the engine exhaust system. The major disadvantage with this scheme is inaccuracy due to variations in the actual pressure drop across the exhaust system caused by exhaust gas heating, changes in engine speed, and physical changes in the exhaust system with time.

Consequently, an alternative, more accurate and dependable technique is needed for determining the exhaust backpressure of a crank case scavenged two-stroke engine for use in engine control compensation.

SUMMARY OF THE INVENTION

According to one aspect of the invention, the average backpressure appearing at exhaust point in the cylinder wall of a crankcase scavenged, two-stroke engine is determined by averaging the pressure of air within an associated crankcase chamber during a portion of the engine cycle when the cylinder inlet and exhaust ports are simultaneously open. During this interval of port opening overlap, a channel for airflow and pressure waves is created between the exhaust port and the crankcase chamber. As a result, the pressure within the crankcase chamber is substantially equal to the backpressure appearing at the cylinder exhaust port, during a predetermined portion of this overlap interval. Consequently, exhaust backpressure can be measured remotely in the crankcase, rather than in the harsh environment of the exhaust system.

According to another aspect of the invention, the predetermined portion of the overlap interval, where the crankcase pressure substantially equals the exhaust backpressure, excludes an initial portion of the interval associated with the equalization of pressure between the cylinder and its crankcase chamber. At the beginning of the overlap interval when the cylinder inlet port is first uncovered, a large pressure differential exists between the crankcase and the cylinder. Thus, during the initial portion of the interval, crankcase pressure is not indicative of exhaust backpressure. By excluding this initial portion from the predetermined portion of the interval, a more accurate indication of the average exhaust backpressure is obtained.

Preferably, the crankcase pressure is derived by sampling the output of a standard pressure sensor disposed within the crankcase chamber. This ability to remotely measure the backpressure in terms of crankcase pressure, avoids the hostile environment of the exhaust system and improves the reliability and durability of the pressure sensor.

Also preferably, the predetermined portion of the port opening overlap interval is determined by rotational positions of the engine during the operating cycle. Consequently, the occurrence of that portion of the overlap interval can be derived from any type of sensor commonly used in determining engine rotational angle for other engine control functions.

A principal advantage in determining exhaust backpressure in accordance with the principles of the present invention is that its value will reflect variations in barometric pressure and any changes in the pressure drop across the engine exhaust system Consequently, correction of engine control based on exhaust backpressure will inherently include compensation for changes in altitude and shifts in local barometric pressure. Also, differences between production exhaust systems and any variations in engine exhaust systems due to damage or aging will be automatically accounted for, without requiring recalibration of the engine control system.

An additional advantage is that, other than a crankcase pressure sensor, no additional sensors or transducers are required to implement the preferred embodiment of the present invention, provided it is applied to a crankcase scavenged engine having a conventional computer control system, including means for sensing engine rotational angle.

These and other aspects and advantages of the invention may be best understood by reference to the following detailed description of a preferred embodiment when considered in conjunction with the accompanying drawings.

DESCRIPTION OF THE PREFERRED EMBODIMENT

Figure 1:
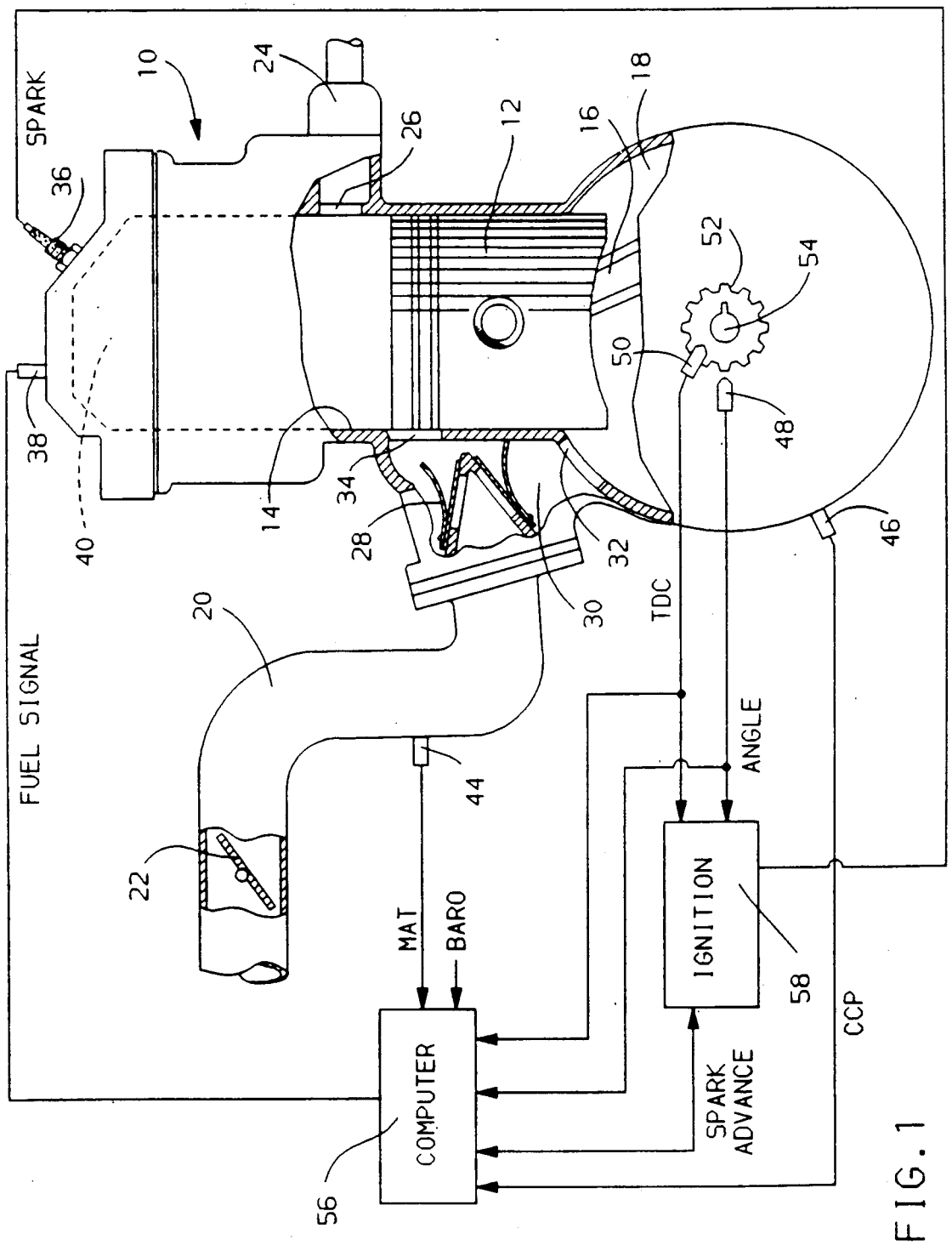
FIG. 1 is a schematic diagram illustrating one cylinder of a crankcase scavenged, two-stroke engine and an accompanying engine control system, which includes the method and means for determining exhaust backpressure according to the principles of this invention.

Referring to FIG. 1, there is shown schematically a crankcase scavenged two-stroke engine, generally designated as 10, with a portion of the engine exterior cut away, exposing cylinder 14. Piston 12 resides within the wall of cylinder 14, with rod 16 connecting piston 12 to a rotatable crankshaft, not shown, but disposed within crankcase chamber 18. Connected to engine 10 is an air intake manifold 20 with a throttle 22, and an exhaust manifold 24. Cylinder 14 communicates with exhaust manifold 24 and the remainder of the engine exhaust system (not shown), through exhaust port 26. Intake manifold 20 communicates with cylinder 14 and crankcase chamber 18 through a reed valve checking mechanism 28, which opens into a common air transfer passage 30 linking crankcase port 32 with inlet port 34 in the wall of cylinder 14. Cylinder 14 is provided with a spark plug 36 and an electric solenoid driven fuel injector 38 projecting into combustion chamber 40.

The operation of engine 10 will now be briefly described based upon the cycle occurring in cylinder 14. During the upstroke, piston 12 moves from its lowest position in cylinder 14 toward top dead center. While moving upwardly, piston 12 covers air inlet port 34 and exhaust port 26, closing them off from the combustion chamber 40, and thereafter, air is inducted into crankcase chamber 18 through reed valve 28. Air in combustion chamber 40, above piston 12, is mixed with fuel from injector 38 and compressed until spark plug 36 ignites the mixture near the top of the stroke. As combustion is initiated, piston 12 begins the downstroke, decreasing the volume of crankcase chamber 18 and compressing the air inducted therein, due to closure of reed valve 28. Toward the end of the downstroke, piston 12 uncovers exhaust port 26, through which combustion products are expelled from engine 10. Shortly thereafter, air inlet port 34 is uncovered, enabling the fresh air trapped within the crankcase chamber 18 to flow into cylinder 14, through the transfer passage 30. Since air inlet port 34 and exhaust port 26 are simultaneously open for a period of time, the entry of fresh air into cylinder 14 aids in driving combusted fuel products out the exhaust port 26. Also, a portion of the fresh air flowing into cylinder 14 escapes out the exhaust port, and will not be available for the next combustion event. The cycle begins anew when piston 12 reaches the its lowest point in cylinder 14.

The operation of engine 10 is controlled by computer 56, which is a conventional digital computer used by those skilled in the art for engine control, and includes the standard elements of a central processing unit, random access memory, read only memory, analog-to-digital converter, input/output circuitry, and clock circuitry. Using input signals from various sensors, which will be described subsequently, computer 56 performs the standard computations required for engine control, and provides a pulsed output FUEL SIGNAL to fuel injector 38 and an output SPARK ADVANCE signal to ignition system 58.

Ignition system 58 generates a high voltage SPARK signal, which is applied to spark plug 36 at the appropriate time, as determined by the SPARK ADVANCE signal supplied by computer 56, and the rotational position of engine 10. Ignition system 58 may include a standard distributor or take any other appropriate form in the prior art.

Associated with engine 10 are various conventional sensors known to the art, which provide input signals to computer 56. Located within the air intake manifold 20 is a temperature sensor 44 for measuring manifold air temperature (MAT). The input signal BARO represents the atmospheric barometric pressure near engine 10, and it may be obtained by employing a standard barometric pressure sensor, or derived by any other means known in the art of engine control. Electromagnetic sensors 48 and 50 provide pulsed signals indicative of crankshaft rotational angle (ANGLE) and the top dead center (TDC) position for cylinder 14, by respectively sensing movement of the teeth on ring gear 52 and disk 54, which are attached to the end of the engine crankshaft. The pulsed TDC and ANGLE signals act as inputs to computer 56 and ignition system 58 and give the rotational position of the engine, which is need for the timing of the SPARK and FUEL SIGNAL outputs. The crankshaft rotational angle $\theta$ from top dead center in cylinder 14 may be obtained by counting the number of pulses occurring in ANGLE, after the TDC pulse, then multiplying the number of counted pulses by the angular spacing of the teeth on ring gear 52. Also, the engine speed in revolutions per minute (RPM) may be obtained by counting the number of TDC pulses which occur in a specified period of time, then multiplying by an appropriate conversion constant.

In the direct fuel injected, crankcase scavenged, two-stroke engine 10, knowledge of the mass of air available for combustion within each cylinder is required to properly control engine parameters such as spark advance, injection timing, and fueling requirements Conventionally, information regarding the available mass of air per cylinder is obtained by measuring air flow into engine 10, using one of the standard types of mass air flow sensors, and then correcting for the efficiency of the engine in trapping air within a cylinder. For an engine operating at a fixed barometric pressure, the trapping efficiency primarily depends upon the design of the engine, the mass of air per cylinder inducted into the engine, and the engine rotational speed.

An alternative method for determining the air mass per cylinder in a crankcase scavenged engine has been previously disclosed in U.S. Pat. No. 4,920,790, issued May 1, 1990, to S. D. Stiles et al, which was previously co-pending with the present application and assigned to the same assignee. Essentially, this alternative technique consists of deriving an estimate for the mass of air inducted and compressed within crankcase chamber 18, prior to its transfer into cylinder 14. Computer 56 estimates the crankcase chamber air mass by integrating the pressure of the air under compression within crankcase chamber 18, with respect to change in crankcase volume, and then dividing by a factor containing the temperature of the crankcase air at the start of compression. A standard pressure sensor 46 is used to measure the pressure within crankcase chamber 18, and provides computer 56 with the input signal CCP indicative of crankcase pressure. The temperature of the air within crankcase chamber 18 at the start of compression is derived from the MAT signal produced by the manifold absolute temperature sensor 44. The estimated value for the mass of air is then corrected for any leakage out of crankcase chamber 18 during compression. The leakage correction is a function of the barometric pressure provided by the BARO signal, and the manifold absolute pressure, as given by the crankcase pressure signal CCP when top dead center occurs in cylinder 14. Finally, this corrected value for the mass of air M', contained within crankcase 18, is multiplied by the cylinder trapping efficiency, to obtain the mass of air transferred and captured within cylinder 14, after closure of air inlet port 34 and exhaust port 26.

In a crankcase scavenged, two-stroke engine such as engine 10, one of the most significant factors affecting the amount of fresh air which enters cylinder 14, and is subsequently lost out exhaust port 26, is the engine exhaust backpressure. The larger the backpressure in exhaust port 26, the smaller will be the mass of air escaping, due to the reduced pressure differential between the exhaust port 26 and cylinder 14, and the smaller the mass of air transferred to cylinder 14 from crankcase chamber 18, due to the corresponding increased resistance to airflow. Since changes in altitude, local barometric pressure, and the engine exhaust system affect the value of exhaust backpressure, the cylinder trapping efficiency can be compensated to account for these changes by including a correction based upon engine exhaust backpressure. Consequently, for proper engine control, an accurate and reliable technique is needed for determining engine exhaust backpressure.

Figure 2:
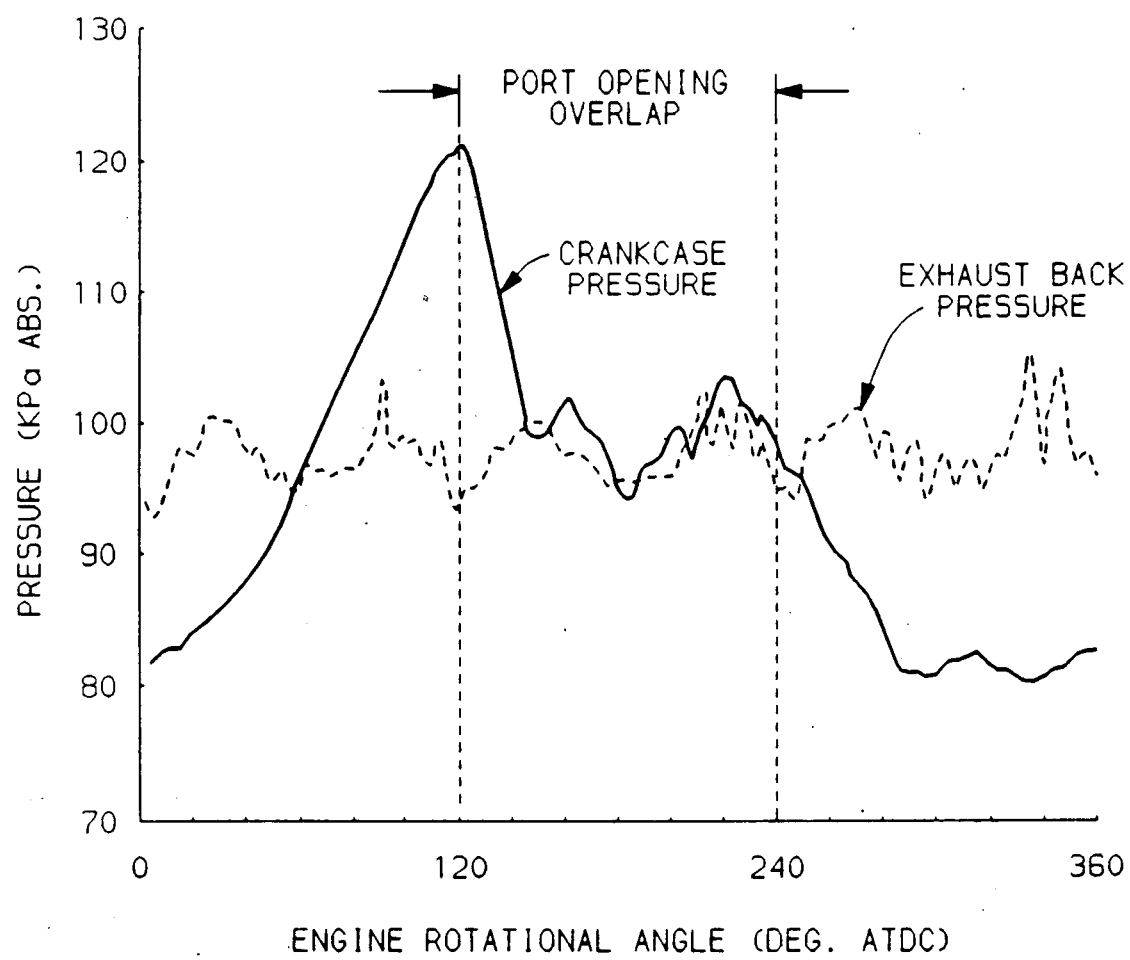
FIG. 2 is a graphical representation of crankcase pressure and exhaust backpressure as a function of engine rotational angle, which also shows the interval of overlap in the opening of cylinder inlet and exhaust ports.

Referring now to FIG. 2, there is shown a typical plot of the crankcase pressure and exhaust gas backpressure, during one complete cycle within cylinder 14 of engine 10. The data represented by FIG. 2 was measured using a 3 cylinder, 1.2 liter, two-stroke engine operating at 1000 revolutions per minute (RPM), to which the preferred embodiment of the present invention has been applied. The design of the engine was such that the inlet port 34 and exhaust port 26 are simultaneously open during the interval of rotation from 120 to 240 degrees after top dead center (ATDC) in cylinder 14. At the start of the interval of port opening overlap (120 degrees), inlet port 34 is opened, allowing the compressed air in crankcase chamber 18 to flow into cylinder 14. At approximately 140 degrees ATDC, the pressure equalizes between cylinder 14 and crankcase chamber 18, and the pressure in the crankcase then approximates the exhaust backpressure over the remainder of the port opening overlap interval (up to 240 degrees ATDC). As engine speed increases, the related number of rotational degrees required for the pressure equalization will also increase, although the applicants have found that such equalization will take place prior to 160 degrees ATDC, for all expected speeds and loads within the normal operating range of the engine to which the invention has been applied. Of course, other engines may have different intervals of port opening overlap, which may be accounted for accordingly.

The preferred embodiment of the present invention takes advantage of the operating characteristics of engine 10, as depicted in FIG. 2, and determines the backpressure appearing at exhaust port 26, by averaging samples of the crankcase pressure signal CCP provided by pressure sensor 46, during a predetermined portion of the port opening overlap interval. The occurrence of the overlap interval is derived from the ANGLE and TDC inputs to computer 56, which indicate the rotational position of engine 10. The cylinder trapping efficiency for engine 10 is then corrected, based upon the value of exhaust backpressure determined in this fashion. This compensated value for the cylinder trapping efficiency is then used by computer 56 in computing the proper fuel pulse width, injector timing, and spark advance for the control of engine 10.

Figure 3:
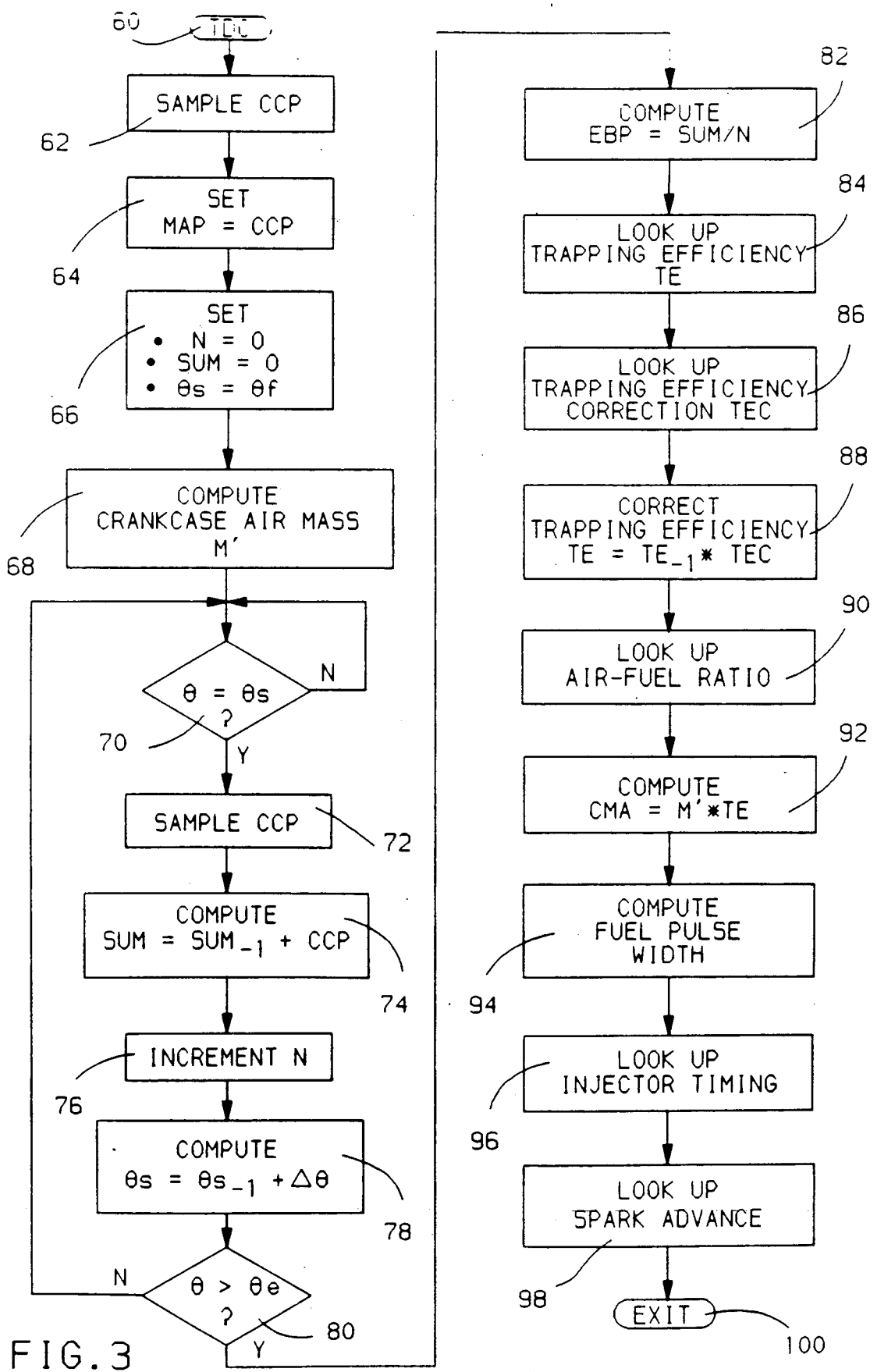
FIG. 3 is a flow diagram representing program instructions executed by the computer in FIG. 1 in determining exhaust backpressure by averaging samples of crankcase pressure measured during a portion of the interval of overlap in the opening of cylinder inlet and exhaust ports.

Referring now to FIG. 3, there is illustrated a flow diagram of a routine executed by computer 56, which contains the necessary steps for determining exhaust backpressure according the principles of the present invention. The programming of computer 56 to implement this series of steps will be clear to any program skilled in the art of engine control.

The routine is entered at point 60, for each occurrence of top dead center in cylinder 14, as initiated by a pulse in the TDC signal provided by sensor 50. At this point in time, the engine rotational angle $\theta$ is zero degrees. Computer 56 determines the value of $\theta$ based upon the input signals TDC and ANGLE as described previously.

The program begins at step 62, where computer 56 samples the signal CCP to obtain the value of the pressure in crankcase chamber 18 at top dead center within cylinder 14.

Next in step 64, the variable MAP, representing the manifold absolute pressure, is assigned the value of the crankcase pressure found in step 62. Applicants have found that the crankcase pressure, at top dead center, represents the pressure in the intake manifold 20, since the reed valve 28 has not yet closed and piston 12 is not yet compressing the air in crankcase chamber 18.

At step 66, the variables N and SUM are both set equal to zero. N represents the number of samples of crankcase pressure CCP which will be averaged in determining exhaust backpressure, while SUM is used to accumulate the sum of the sampled crankcase pressure values. In addition, the variable $\theta s$ is set to the value represented by $\theta f$. The variable $\theta s$ represents a rotational angle of the engine where crankcase pressure is to be sampled for later averaging, while $\theta f$ represents the rotational angle where the first sample of crankcase pressure is to be be taken. In the preferred embodiment of the present invention, $\theta f$ is set equal to 160 degrees ATDC. As mentioned previously, the interval of port opening overlap in engine 10 occurs for rotational angles ranging from 120 to 240 degrees ATDC. Applicants have found that by delaying the start of sampling of crankcase pressure until $\theta f = 160$ degrees ATDC, sufficient time is allowed after intake port 34 is uncovered for pressure equalization in the crankcase chamber 18 and cylinder 14. Of course, this value will vary for another engine having a substantially different porting structure.

Next at step 68, the value for the mass of air M' trapped within crankcase chamber 18, is computed by integrating the crankcase pressure as indicated previously.

In the next series of steps from 70 to 82, the average value for the exhaust backpressure EBP is determined by averaging samples of crankcase pressure CCP which have been sampled during the predetermined portion of the overlap interval.

At step 70, a decision is made as to whether the engine rotational angle $\theta$ is equal to the sampling angle $\theta s$, where a sample of crankcase pressure is to be taken The first time step 70 is encountered after top dead center, $\theta s$ will equal 160 degrees, as set in step 66 above. Thus, if engine 10 has not yet rotated to where $\theta = 160$ degrees, step 70 is repeated until $\theta = 160$ degrees, at which time the program proceeds to step 72.

At step 72, a sample of crankcase pressure is obtained by sampling the signal CCP provided by pressure sensor 46. The value of sampled crankcase pressure is assigned to the program variable CCP.

At step 74, a value for the variable SUM is computed by adding its previous value, represented by $SUM_{-1}$, and the sampled value of crankcase pressure CCP. The first time step 74 is executed after top dead center, $SUM_{-1}$ will equal zero as set in step 66 above. Thereafter, SUM will represent the accumulated sum of crankcase pressure samples taken at the sampling angles defined by $\theta s$.

At step 76, the value of N is incremented by 1 to account for the crankcase pressure sample added to SUM at step 74. N represents the total number of crankcase pressure samples that have been added at step 74.

Next at step 78, a new value for the rotational sampling angle $\theta s$ is computed by adding its previous value $\theta s_{-1}$ and the sampling angle increment $\Delta \theta$. In the preferred embodiment, $\Delta \theta$ is equal to 20 degrees, however, other embodiments are possible using different values for the sampling angle increment. In general, smaller values of $\Delta \theta$ will provide a more accurate numerical estimate for the average value of the crankcase pressure, during the predetermined portion of the overlap interval, limited of course by the data processing speed of computer 56.

At step 80, the decision is made as to whether the rotational angle $\theta$ is greater than $\theta e$, the end of the interval of port opening overlap, where the averaging of crankcase pressure ceases. For engine 10, $\theta e$ is equal to 240 degrees ATDC, where intake port 34 is covered by the upstroke of piston 12. If $\theta$ is not yet greater than $\theta e$, the program proceed to repeat steps 70 through 80 and take the next sample of crankcase pressure as defined by the new rotational sampling angle $\theta s$ determined at step 78. If, however, $\theta$ is greater than $\theta e$, sampling ceases and the program proceeds to the next step 82.

At step 82, the average value for the exhaust backpressure EBP is computed by dividing the sum of the crankcase pressure samples SUM by N, the number of samples added. Thus, in the preferred embodiment, the average exhaust backpressure is assigned a value equal to the numerical average of samples of crankcase pressure taken over a portion of the interval of port opening overlap defined by rotational angles ranging from 160 to 240 degrees ATDC. Crankcase pressure is sampled at the specified engine rotational positions of 160, 180, 200, 220, and 240 degrees ATDC, for a total of five samples, which are then averaged to obtain the exhaust backpressure.

At step 84, the program looks up a value for trapping efficiency TE in a table stored in memory, as a function of values for M', calculated previously at step 68, and the current engine speed in RPM, which is related to the time available for air to pass through inlet port 34 or be lost out exhaust port 26. The trapping efficiency TE represents that percentage of the mass air M' within crankcase chamber 18, which is transferred and captured within combustion chamber 40, after closure of air inlet port 34 and exhaust port 26. Values for trapping efficiency are determined apriori using standard engine dynamometer procedures known to those skilled in the art of engine control, as are the other look up tables that will be referred to subsequently.

Next at step 86, a trapping efficiency correction factor TEC is looked up in a table stored in memory as a function of the difference between the exhaust backpressure EBP, found at step 82, and the manifold absolute pressure MAP, found at step 64. This correction factor is required to compensate the trapping efficiency TE for any changes in exhaust backpressure EBP and manifold absolute pressure MAP from their nominal values at the time the trapping efficiency values were experimentally determined on the dynamometer.

At step 88, a new corrected value for the trapping efficiency TE is obtained by multiplying the previous value for the trapping efficiency $TE_{-1}$ by the trapping efficiency correction factor TEC. Thus, this new value for TE will be automatically compensated when changes occur in the engine exhaust system, in the altitude of engine operation, or in the local barometric pressure due to variations in weather.

Next at step 90, the appropriate air-fuel ratio A/F for cylinder 14 is looked up in a stored table, using values for the crankcase air mass M' determined at step 68 and the engine speed in RPM.

At step 92, the mass of air CMA, which is available for combustion within cylinder 14, is computed by multiplying the crankcase air mass M'0 by the corrected trapping efficiency TE, found at step 88, according to the equation $$CMA = M' * TE.$$

In the remaining steps 94 to 98, the combustion chamber mass air CMA, found at step 92, is used to compute standard engine control parameters. At step 94, the injector fuel pulse width FPW is computed according to the following:

$$FPW = K * CMA * [1/(A/F)],$$

where K is a predetermined units scaling constant stored in memory, CMA was found in step 92, and A/F was determined in step 90. Next, at step 96, the proper timing for the output fuel injector pulse is looked up in the appropriate table stored in memory, based upon the value of the engine speed in RPM and the combustion chamber mass air CMA. Using the computed values for fuel pulse width FPW and the injector pulse timing, computer 56 provides the appropriate FUEL SIGNAL (see FIG. 1) to injector 38. Finally, at step 98, the correct spark advance for cylinder 14 is found in a stored look up table as a function of engine speed in RPM and combustion chamber mass air CMA. Computer 56 then provides ignition system 58 with the SPARK ADVANCE signal so that spark plug 36 can be fired at the proper time in advance of top dead center for cylinder 14. After the above steps have been executed, the routine is exited at 100.

The foregoing description of a preferred embodiment of the invention is for the purpose of illustrating the invention, and is not to be considered as limiting or restricting the invention, since many modifications may be made by the exercise of skill in the art without departing from the scope of the invention.

The embodiments of the invention in which an exclusive property or privilege is claimed are defined as follows:

1. In a crankcase scavenged two-stroke engine having a separate crankcase chamber associated with each engine cylinder, inlet and exhaust ports in the wall of each cylinder that are simultaneously open during an overlap interval in each engine cycle, and an engine control system of the type in which the mass of air trapped in a cylinder is determined by the amount of air inducted into the cylinder crankcase compensated as a function of backpressure at the exhaust port of the cylinder; a method for obtaining an indication of the backpressure at a cylinder exhaust port comprising the steps of:

deriving an indication of the air pressure within the crankcase chamber associated with the cylinder, during a predetermined portion of the overlap interval, when an airflow passage is established between the crankcase chamber and the cylinder exhaust port;

averaging the indicated crankcase air pressure to obtain an indication of the backpressure at the exhaust port.

2. The method of claim 1, wherein the predetermined portion of the overlap interval of the cylinder excludes an initial portion of the overlap interval associated with the equalization of pressure between the cylinder and its associated crankcase chamber.

3. The method of claim 2, wherein:

the predetermined portion of the overlap interval is defined by rotational positions in the engine cycle; and the indication of crankcase pressure is derived by sampling the output of a pressure sensor disposed within the crankcase chamber.

4. In a crankcase scavenged two-stroke engine having a separate crankcase chamber associated with each engine cylinder, inlet and exhaust ports in the wall of each cylinder that are simultaneously open during an overlap interval in each engine cycle, and an engine control system of the type in which the mass of air trapped in a cylinder is determined by the amount of air inducted into the cylinder crankcase compensated as a function of backpressure at the exhaust port of the cylinder; an apparatus for obtaining an indication of the backpressure at a cylinder exhaust port comprising:

means for deriving an indication of the air pressure within the crankcase chamber associated with the cylinder, during a predetermined portion of the overlap interval, when an airflow passage is established between the crankcase chamber and the cylinder exhaust port;

means for averaging the indicated crankcase air pressure to obtain an indication of the backpressure at the exhaust port.

5. The apparatus of claim 4, wherein the predetermined portion of the overlap interval of the cylinder excludes an initial portion of the overlap interval associated with the equalization of pressure between the cylinder and its associated crankcase chamber.

6. The method of claim 5, wherein:

the predetermined portion of the overlap interval is defined by rotational positions in the engine cycle; and the indication of crankcase pressure is derived by sampling the output of a pressure sensor disposed within the crankcase chamber.

* * * * *